United States Patent [19]  [11] Patent Number: 4,756,199
Merritt  [45] Date of Patent: Jul. 12, 1988

[54] HOSIERY SIZING APPARATUS AND METHOD

[75] Inventor: Robert E. Merritt, Mount Airy, N.C.

[73] Assignee: Renfro Corporation, Mount Airy, N.C.

[21] Appl. No.: 58,145

[22] Filed: Jun. 4, 1987

[51] Int. Cl.⁴ .............................................. G01L 5/04
[52] U.S. Cl. .................... 73/862.39; 73/159; 73/826; 73/856; 73/862.47; 223/75; 33/2 A
[58] Field of Search ........... 73/862.07, 862.39, 862.47, 73/159, 862.48, 805, 806, 826, 856; 223/75, 60; 33/2 A

[56] References Cited

U.S. PATENT DOCUMENTS

| | | |
|---|---|---|
| 1,614,388 | 1/1927 | Rabinoritach ................ 223/75 |
| 2,675,703 | 4/1954 | Hemmerich et al. .......... 73/159 |
| 3,296,857 | 1/1967 | Klaczeus .................. 73/862.47 X |
| 3,415,431 | 12/1968 | Maltenfort ................ 223/75 |
| 3,498,120 | 3/1970 | MacMillan ................ 73/862.07 X |
| 3,750,466 | 8/1973 | Ott et al. ................ 73/862.47 X |
| 3,839,908 | 10/1974 | Casper .................. 73/862.47 |
| 3,975,956 | 8/1976 | Peel ...................... 73/159 |
| 4,137,763 | 2/1979 | Swallow .................. 73/159 |

FOREIGN PATENT DOCUMENTS 71218 2/1910 German Democratic Rep. ...................... 73/862.47
470721 5/1975 U.S.S.R. ................. 73/862.47

Primary Examiner—Tom Noland
Attorney, Agent, or Firm—Bell, Seltzer, Park & Gibson

[57] ABSTRACT

The hosiery article is drawn onto a sizing form having uniformly shaped openings positioned in several spaced locations therealong and underlying the hosiery article positioned on the form. The sizing form is dimensioned and shaped to maintain the hosiery article under substantially the same tensioned condition the hosiery article would be placed under during wear by a person having a particular size foot and leg. A hand-held tension gauge is then positioned against the area of the hosiery article overlying the openings in the sizing form to measure the tension in various locations along the length of the hosiery article supported on the sizing form to determine if the hosiery article is of the proper designated size.

6 Claims, 1 Drawing Sheet

HOSIERY SIZING APPARATUS AND METHOD

FIELD OF THE INVENTION

This invention relates generally to a hosiery sizing apparatus and method, and more particularly to an apparatus and method for accurately measuring and determining the tension in hosiery articles positioned on sizing forms.

BACKGROUND OF THE INVENTION

In the manufacture and marketing of hosiery products, such as socks and anklets, it is commercially important to know which size, or range of sizes, a sock will fit comfortably. Put another way, it is important to know if a sock will fit comfortably the size, or range of sizes, that it is specified to fit.

The National Association of Hosiery Manufacturers has developed a set of standard size forms to facilitate the testing for the fit of below-the-knee hosiery, i.e. socks and anklets. Each form represents a particular size foot and leg and is designed so that its critical surface dimensions approximate those of a human foot and leg of the same size. When a sock fits one of these standard size forms, without being unduly loose or tight, the sock can be said to fit a human foot of the same size. These standard size forms have been widely accepted by the hosiery industry as the standard for determining and measuring size.

It is relatively easy to determine if a sock is too loose because of the presence of wrinkles or areas where the sock does not touch the form. On the other hand, even among skilled and experienced technicians, there often is wide disagreement over whether or not a sock is too tight on a particular form.

Others have recognized the need for determining the tension in the fabric of hosiery articles supported on hosiery forms. For example, a stocking testing device is disclosed in U.S. Pat. No. 2,675,703 which includes a "standard" leg form with pressure strips incorporated in various locations along the form and movable outwardly against the hosiery article positioned thereon to determine the tension applied to the form by the hosiery fabric. However, this type of testing device is very expensive to construct and maintain. U.S. Pat. Nos. 3,975,956 and 4,137,763 disclose hosiery testing devices particularly adapted for testing the compressive force in support hosiery. These testing devices include a form onto which the hosiery article is drawn and the tension in the hosiery article is then tested at various locations along the length of the hosiery form. The testing devices of these patents are also expensive to construct and maintain and are not readily adaptable to use in testing the size of below-the-knee hosiery articles.

Another method in use employs a foot form with the foot portion constructed of two pieces in such a way that the form can be expanded in the lengthwise direction. After the sock is placed on this form and the heel is clamped in place, a measured force is applied to the toe to extend the sock, and this extension is measured. To obtain sufficient accuracy, a relatively large and expensive tensile testing machine, such as is manufactured by Instron, is required. Another drawback of this method is that it is sensitive primarily to fabric tension in the lengthwise or walewise direction while largely ignoring the widthwise or coursewise component of tension.

SUMMARY OF THE INVENTION

With the foregoing in mind, it is an object of the present invention to provide a hosiery sizing apparatus and method for measuring the tension in both lengthwise or walewise and widthwise or coursewise directions in a hosiery article positioned on a standard hosiery sizing form in an economical and simple manner, and to accurately determine if the hosiery article positioned on the sizing form is of the proper size to fit the wearer represented by the standard sizing form.

The hosiery sizing apparatus of the present invention includes an elongate sizing form onto which the hosiery article is drawn and which is shaped to maintain the hosiery article under substantially the same tensioned condition in which the hosiery article would be placed during wear by a person having a particular foot and leg size. Uniformly shaped openings are positioned in several spaced locations along the length of the sizing form and underlie the hosiery article positioned on the sizing form. A hand-held tension gauge is provided with a foot member adapted to engage the area of the hosiery article surrounding the openings in the sizing form. An alignment ring extends downwardly from the foot member and is adapted to extend into and accurately position the tension gauge in the various openings in the sizing form. A force-gauge plunger has one end operatively connected to the tension gauge and the opposite end portion extends through and beyond the alignment ring for engagement with the portion of the hosiery article extending across the openings in the sizing form. The force-gauge plunger operates to measure the tension in various locations along the length of the hosiery article supported on the sizing form. Thus, the tension gauge provides an accurate indication to the tester of the amount of tension being applied to the sizing form by the hosiery article. The tester can easily and quickly determine if the measured amount of tension is greater or lesser than a predetermined standard and to thereby indicate if the hosiery article is knit of the proper size to properly fit the foot and leg of the wearer which corresponds with the standard sizing form.

BRIEF DESCRIPTION OF THE DRAWINGS

Other objects and advantages will appear as the description proceeds when taken in connection with the accompanying drawings, in which.

DESCRIPTION OF THE ILLLUSTRATED EMBODIMENT

Figure 1:
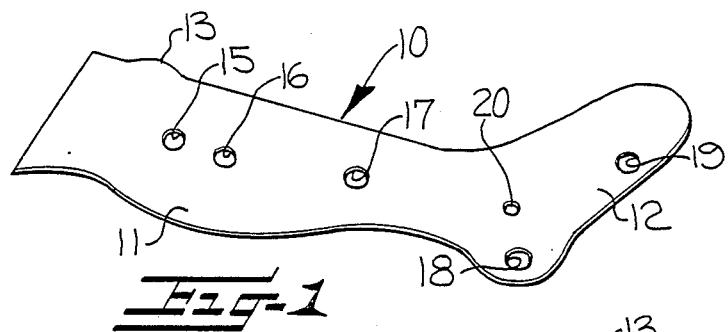
FIG. 1 is a perspective view of an elongate sizing form forming a part of the present hosiery sizing apparatus.

The hosiery sizing apparatus of the present invention is adapted to accurately measure and determine the tension in a hosiery article positioned on a sizing form, of the type broadly indicated at 10 in FIG. 1. The sizing form 10 is illustrated as being a standard NAHM sizing form for all knee-high and shorter hosiery articles and is shaped to maintain the hosiery article under substantially the same tensioned condition the hosiery article would be placed in during wear by a person having a particular size foot and leg. The standard hosiery sizing form is plate-like and has opposite flat faces and opposite side edges and includes an elongate leg portion 11 and an integrally formed elongate foot portion 12 extending from the leg portion 11 at an angle relative thereto. The upper portion of one side of the leg portion 11 is provided with an outwardly extending bulge 13 which represents the position of the knee on the sizing form.

This standard NAHM sizing form has been modified, in accordance with the present invention, to provide uniformly shaped openings positioned in several spaced locations along the sizing form and underlying the hosiery article positioned thereon. These uniformly shaped openings are illustrated in FIG. 1 as circular holes 15-19, which are one inch in diameter and extend completely through the form 10. The hole 15 is positioned at the location normally occupied by the welt or cuff of a knee-high type sock while the hole 16 is positioned in the calf area of such a sock. The hole 17 is positioned in the area of the ankle of the sock while the hole 18 is positioned in the heel area and the hole 19 is positioned in the toe area. A smaller hole 20 is provided adjacent the hole 18 to provide a location point for locating the inner end of the gore line of the hosiery article thereon.

The hosiery sizing apparatus of the present invention also includes a hand-held tension gauge broadly indicated at 30, and including a circular foot member 31 fixed to and extending below the tension gauge 30. The circular foot member 31 is provided with a lower surface adapted to engage the area of the hosiery article surrounding the openings 15-19 in the sizing form 10. An alignment ring 32 is integrally formed with the foot member 31 and extends downwardly therefrom with the outer peripheral surface being adapted to extend partially into the openings 15-19 in the sizing form 10. A force-gauge plunger 35 has its upper end portion operatively connected to a tension indicating pointer 36 forming a part of the conventional tension gauge 30 and supported for movement along a tension indicating scale 37. The lower end of the force-gauge plunger 35 is provided with an enlarged head member 38 which extends through and beyond the alignment ring 32 for engagement with the portion of the hosiery article extending across the openings 15-19 in the sizing form 10. The head member 38 operates to measure the tension in various locations along the length of the hosiery article supported on the sizing form 10 by placement of the ring 32 of the foot member 31 of the tension gauge 30 in the openings 15-19 during the testing operation.

METHOD OF OPERATION

In using the sizing apparatus of the present invention, a single sizing form 10 may be used to check the size of an item of hosiery knit of a substantially non-stretch type yarn and intended to fit only one size wearer. To check the size of an item of hosiery knit of a stretch type yarn and intended to fit several sizes of wearers, only the larger size form will be used. For example, for a stretchable hosiery article designated to fit sizes 9-11, the hosiery article must be positioned on a size 11 sizing form to determine if the sock will fit the largest extreme of the size range so designated.

Figure 2:
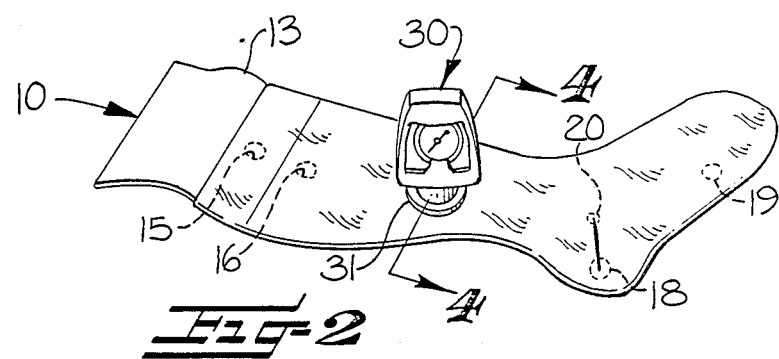
FIG. 2 is a view similar to FIG. 1 but showing a knee-high type of hosiery article positioned on the sizing form and illustrating a hand-held tension gauge being utilized to measure and determine the amount of tension in the fabric of the hosiery article positioned on the sizing form.
Figure 3:
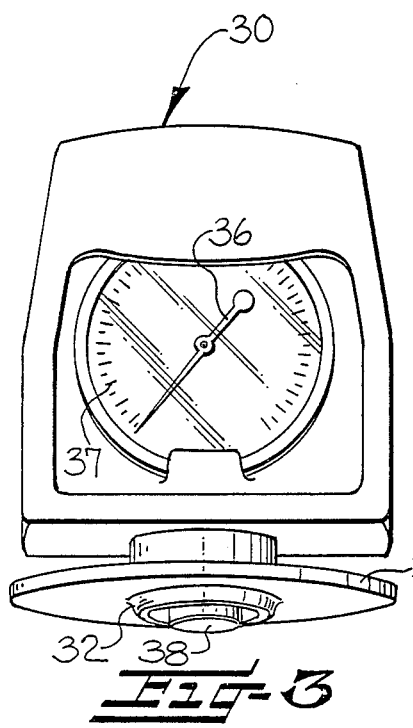
FIG. 3 is an enlarged front elevational view of the tension gauge with the upper end being tilted rearwardly.
Figure 4:
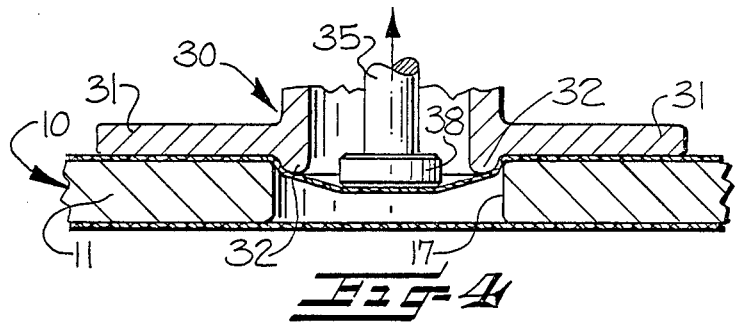
FIG. 4 is a greatly enlarged fragmentary vertical sectional view taken substantially along the line 4—4 in FIG. 2.
Figure 5:
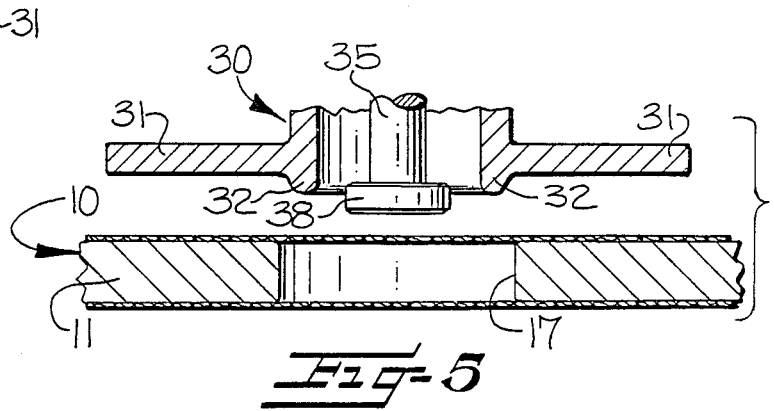
FIG. 5 is a view similar to FIG. 4 but showing the lower portion of the tension gauge in slightly raised position above the sizing form and the hosiery article positioned thereon.

In both instances, the hosiery article is drawn onto the sizing form 10 and properly positioned thereon so that the fabric exhibits no wrinkles and is in a relaxed state. The fit of the hosiery article on the form 10 is then visually observed and in the case of a knee-high hosiery article, as illustrated in FIG. 2, the top of the cuff or hem portion of the hosiery article should extend upwardly to a point just below the knee bulge 13, and the gore line at the heel should be aligned with the openings 18 and 20.

If the length of the foot and the length of the leg appear to be visually correct, and there are no wrinkles or loose areas in the sock, the tension in the sock is then measured in various locations along the hosiery form by successively positioning the hand-held tension gauge 30 in the openings 15-19 and measuring the tension of the sock along these various locations by observing the position of the pointer 36 on the tension gauge 37. If the amount of tension measured at the various locations is within the prescribed limits, it can then be concluded that the hosiery article is knit of the proper size to fit the designated foot and leg size of the wearer. On the other hand, if the measured tension in the hosiery article is greater than a prescribed limit, the tester will know that the sock will be too tight for comfortable wear by a person having a foot and leg of the designated size.

The provision of the foot member 31 against the hosiery article in the area surrounding the openings and the alignment ring 32, insures that the tension in the hosiery is measured under uniform conditions during each measurement. The steps of measuring the tension at the various locations along the length of the hosiery article can be carried out in a very short time and requires no special skill or training on the part of the tester.

Thus, the hosiery sizing apparatus of the present invention provides an accurate measurement and determination of the tension of the hosiery article when positioned on a standard sizing form so that the tester can immediately determine if the hosiery article is too tight on the sizing form, without relying upon skill and judgment. The measuring of the tension in the hosiery article is carried out in a simple and efficient manner by positioning the hand-held tension gauge 30 in the openings 15-19, after the hosiery article has been drawn onto the sizing form.

In the drawings and specification there has been set forth the best mode presently contemplated for the practice of the present invention, and although specific terms are employed, they are used in a generic and descriptive sense only and not for purposes of limitation, the scope of the invention being defined in the claims.

That which is claimed is:

1. A hosiery sizing apparatus for measuring the tension in a hosiery article positioned on a sizing form and comprising
   (a) an elongate sizing form onto which the hosiery article is drawn and being shaped to maintain the hosiery article under substantially the same tensioned condition the hosiery article would be placed in during wear by a person having a particular size foot and leg, (b) uniformly shaped openings positioned in several spaced locations along said sizing form and underlying the hosiery article positioned on said sizing form, and (c) a hand-held tension gauge including a foot member adapted to engage selectively each area of the hosiery article surrounding a selected one of said openings in said sizing form, an alignment member extending downwardly from said foot member and being adapted to extend into said selected opening in said sizing form, and a force-gauge plunger having one end poriton operatively connected to said tension gauge and an opposite end portion extending through and beyond said alignment member for engagement with the portion of the hosiery article extending across said selected opening in said sizing form and being operative to measure the tension thereat in the hosiery article supported on said sizing form.

2. A hosiery sizing apparatus according to claim 1 wherein said elongate sizing form is plate-like and has opposite flat faces, and wherein said uniformly shaped openings are circular and extend completely through said sizing form.

3. A hosiery sizing apparatus according to claim 2 including an additional opening in a selected location along said form for aiding in properly positioning said hosiery article on said sizing form.

4. A hosiery sizing apparatus according to claim 2 wherein said sizing form includes an elongate leg portion and an integrally formed elongate foot portion extending from said leg portion at an angle relative thereto.

5. A hosiery sizing apparatus according to claim 2 wherein said foot member is circular, and wherein said alignment member comprises a ring of smaller diameter than said foot member.

6. A method of sizing hosiery articles comprising the steps of (a) drawing a hosiery article onto an elongate sizing form having uniformly shaped openings positioned in several spaced locations along the sizing form and underlying the hosiery article positioned on the form, said sizing form being shaped to maintain the hosiery article under substantially the same tensioned condition the hosiery article would be placed under during wear by a person having a particular size foot and leg, and (b) positioning a hand-held tension gauge against each area of the hosiery article overlying the openings in the sizing form and measuring the tension thereat to determine if the hosiery article properly fits the particular sizing form.

* * * * *